United States Patent
Buxbaum et al.

(10) Patent No.: US 9,507,682 B2
(45) Date of Patent: Nov. 29, 2016

(54) DYNAMIC GRAPH PERFORMANCE MONITORING

(71) Applicant: Ab Initio Technology LLC, Lexington, MA (US)

(72) Inventors: Mark Buxbaum, Acton, MA (US); Michael G. Mulligan, Lexington, MA (US); Tim Wakeling, Andover, MA (US); Matthew Darcy Atterbury, Lexington, MA (US)

(73) Assignee: Ab Initio Technology LLC, Lexington, MA (US)

(*) Notice: Subject to any disclaimer, the term of this patent is extended or adjusted under 35 U.S.C. 154(b) by 0 days.

(21) Appl. No.: 13/678,921

(22) Filed: Nov. 16, 2012

(65) Prior Publication Data
US 2014/0143760 A1 May 22, 2014

(51) Int. Cl.
*G06F 11/30* (2006.01)
*G06F 11/34* (2006.01)
(Continued)

(52) U.S. Cl.
CPC ....... *G06F 11/3041* (2013.01); *G06F 11/3003* (2013.01); *G06F 11/323* (2013.01); *G06F 11/3404* (2013.01); *G06F 11/3476* (2013.01);
(Continued)

(58) Field of Classification Search
CPC .............. G06Q 10/06; G06Q 30/0201; G06F 11/3476; G06F 8/20; G06F 11/323; G06F 11/3003; G06F 11/3404; G06F 11/3082; G06F 11/3419; G06F 2201/865
USPC ....... 717/113, 155, 156, 124, 154, 110, 132, 717/144, 133, 135, 158, 126, 127
See application file for complete search history.

(56) References Cited

U.S. PATENT DOCUMENTS

| 3,662,343 A | 5/1972 | Goldstein et al. |
| 3,662,401 A | 5/1972 | Collins et al. |

(Continued)

FOREIGN PATENT DOCUMENTS

| CN | 1965296 | 5/2007 |
| CN | 101702942 | 5/2010 |

(Continued)

OTHER PUBLICATIONS

International Search Report & Written Opinion received in PCT application No. PCT/US2013/070386, mailed Feb. 12, 2014, 7 pages.

(Continued)

*Primary Examiner* — Lewis A Bullock, Jr.
*Assistant Examiner* — Jacob Dascomb
(74) *Attorney, Agent, or Firm* — Fish & Richardson P.C.

(57) ABSTRACT

Methods, systems, and apparatus, including computer programs encoded on computer storage media, for dynamic graph performance monitoring. One of the methods includes receiving multiple units of work that each include one or more work elements. The method includes determining a characteristic of the first unit of work. The method includes identifying, by a component of the first dataflow graph, a second dataflow graph from multiple available dataflow graphs based on the determined characteristic, the multiple available dataflow graphs being stored in a data storage system. The method includes processing the first unit of work using the second dataflow graph. The method includes determining one or more performance metrics associated with the processing.

24 Claims, 10 Drawing Sheets

(51) Int. Cl.
*G06F 11/32* (2006.01)
*G06Q 30/02* (2012.01)

(52) U.S. Cl.
CPC ........ *G06F 11/3082* (2013.01); *G06F 11/3419* (2013.01); *G06F 2201/865* (2013.01); *G06Q 30/0201* (2013.01)

(56) References Cited

U.S. PATENT DOCUMENTS

| | | |
|---|---|---|
| 4,228,496 A | 10/1980 | Katzman et al. |
| 4,922,418 A | 5/1990 | Dolecek |
| 4,972,314 A | 11/1990 | Getzinger et al. |
| 5,127,104 A | 6/1992 | Dennis |
| 5,276,899 A | 1/1994 | Neches |
| 5,280,619 A | 1/1994 | Wang |
| 5,301,336 A | 4/1994 | Kodosky |
| 5,323,452 A | 6/1994 | Dickman et al. |
| 5,333,319 A | 7/1994 | Silen |
| 5,357,632 A | 10/1994 | Pian et al. |
| 5,495,590 A | 2/1996 | Comfort et al. |
| 5,504,900 A | 4/1996 | Raz |
| 5,630,047 A | 5/1997 | Wang |
| 5,692,168 A | 11/1997 | McMahan |
| 5,701,400 A | 12/1997 | Amardo |
| 5,712,971 A | 1/1998 | Stanfill et al. |
| 5,745,778 A | 4/1998 | Alfieri |
| 5,799,266 A | 8/1998 | Hayes |
| 5,802,267 A | 9/1998 | Shirakihara et al. |
| 5,805,462 A | 9/1998 | Poirot et al. |
| 5,857,204 A | 1/1999 | Lordi et al. |
| 5,923,832 A | 7/1999 | Shirakihara et al. |
| 5,924,095 A | 7/1999 | White |
| 5,930,794 A | 7/1999 | Linenbach et al. |
| 5,933,640 A | 8/1999 | Dion |
| 5,950,212 A | 9/1999 | Anderson et al. |
| 5,966,072 A | 10/1999 | Stanfill et al. |
| 5,999,729 A | 12/1999 | Tabloski, Jr. et al. |
| 6,006,242 A | 12/1999 | Poole et al. |
| 6,012,094 A | 1/2000 | Leyman |
| 6,014,670 A | 1/2000 | Zamanian et al. |
| 6,016,516 A | 1/2000 | Horikiri |
| 6,032,158 A | 2/2000 | Mukhopadhhyay et al. |
| 6,038,558 A | 3/2000 | Powers et al. |
| 6,044,211 A | 3/2000 | Jain |
| 6,044,374 A | 3/2000 | Nesamoney et al. |
| 6,044,394 A | 3/2000 | Cadden et al. |
| 6,088,716 A | 7/2000 | Stanfill et al. |
| 6,145,017 A | 11/2000 | Ghaffari |
| 6,173,276 B1 | 1/2001 | Kant et al. |
| 6,208,345 B1 | 3/2001 | Sheard et al. |
| 6,256,637 B1 | 7/2001 | Venkatesh et al. |
| 6,259,988 B1 | 7/2001 | Galkowski et al. |
| 6,272,650 B1 | 8/2001 | Meyer et al. |
| 6,301,601 B1 | 10/2001 | Helland |
| 6,314,114 B1 | 11/2001 | Coyle et al. |
| 6,324,437 B1 | 11/2001 | Frankel et al. |
| 6,330,008 B1 | 12/2001 | Razdow et al. |
| 6,332,212 B1 | 12/2001 | Organ et al. |
| 6,339,775 B1 | 1/2002 | Zamanian et al. |
| 6,400,996 B1 | 6/2002 | Hoffberg et al. |
| 6,401,216 B1 | 6/2002 | Meth et al. |
| 6,437,796 B2 | 8/2002 | Sowizral et al. |
| 6,449,711 B1 | 9/2002 | Week |
| 6,480,876 B2 | 11/2002 | Rehg et al. |
| 6,496,961 B2 | 12/2002 | Gupta et al. |
| 6,538,651 B1 | 3/2003 | Hayman et al. |
| 6,584,581 B1 | 6/2003 | Bay et al. |
| 6,608,628 B1 | 8/2003 | Ross et al. |
| 6,611,862 B2 | 8/2003 | Reisman |
| 6,651,234 B2 | 11/2003 | Gupta et al. |
| 6,654,907 B2 | 11/2003 | Stanfill et al. |
| 6,658,464 B2 | 12/2003 | Reisman |
| 6,715,145 B1 | 3/2004 | Bowman-Amuah |
| 6,728,879 B1 | 4/2004 | Atkinson |
| 6,760,903 B1 | 7/2004 | Morshed et al. |
| 6,813,761 B1 | 11/2004 | Das et al. |
| 6,816,825 B1 | 11/2004 | Ashar et al. |
| 6,832,369 B1 | 12/2004 | Kryka et al. |
| 6,848,100 B1 | 1/2005 | Wu et al. |
| 6,879,946 B2 | 4/2005 | Rong et al. |
| 6,975,628 B2 | 12/2005 | Johnson |
| 7,062,483 B2 | 6/2006 | Ferrari et al. |
| 7,082,604 B2 | 7/2006 | Schneiderman |
| 7,085,426 B2 | 8/2006 | August |
| 7,103,597 B2 | 9/2006 | McGovern |
| 7,103,620 B2 | 9/2006 | Kunz et al. |
| 7,130,484 B2 | 10/2006 | August |
| 7,137,116 B2 | 11/2006 | Parkes et al. |
| 7,164,422 B1 | 1/2007 | Wholey et al. |
| 7,165,030 B2 | 1/2007 | Yi et al. |
| 7,167,850 B2 | 1/2007 | Stanfill |
| 7,316,001 B2 | 1/2008 | Gold et al. |
| 7,356,819 B1 | 4/2008 | Ricart et al. |
| 7,398,514 B2 | 7/2008 | Ulrich et al. |
| 7,412,658 B2 | 8/2008 | Gilboa |
| 7,417,645 B2 | 8/2008 | Beda et al. |
| 7,457,984 B2 | 11/2008 | Kutan |
| 7,467,383 B2 | 12/2008 | Inchingolo et al. |
| 7,505,975 B2 | 3/2009 | Luo |
| 7,577,628 B2 | 8/2009 | Stanfill |
| 7,594,220 B2 | 9/2009 | Kodosky et al. |
| 7,636,699 B2 | 12/2009 | Stanfill |
| 7,716,630 B2 | 5/2010 | Wholey et al. |
| 7,756,940 B2 | 7/2010 | Sagawa |
| 7,840,949 B2 | 11/2010 | Schumacher et al. |
| 7,870,556 B2 | 1/2011 | Wholey et al. |
| 7,877,350 B2 | 1/2011 | Stanfill et al. |
| 7,979,479 B2 | 7/2011 | Staebler et al. |
| 8,281,297 B2 | 10/2012 | Dasu et al. |
| 8,286,176 B1 | 10/2012 | Baumback et al. |
| 8,566,641 B2 | 10/2013 | Douros et al. |
| 8,595,262 B1 * | 11/2013 | Hayden ........................ 707/798 |
| 9,274,926 B2 | 3/2016 | Larson et al. |
| 2001/0055019 A1 | 12/2001 | Sowizral et al. |
| 2002/0080181 A1 | 6/2002 | Razdow et al. |
| 2002/0087921 A1 | 7/2002 | Rodriguez |
| 2002/0091747 A1 | 7/2002 | Rehg et al. |
| 2002/0091748 A1 | 7/2002 | Rehg et al. |
| 2002/0107743 A1 | 8/2002 | Sagawa |
| 2002/0111876 A1 | 8/2002 | Rudraraju et al. |
| 2002/0129340 A1 | 9/2002 | Tuttle |
| 2002/0147745 A1 | 10/2002 | Houben et al. |
| 2002/0184616 A1 | 12/2002 | Chessell et al. |
| 2003/0004771 A1 | 1/2003 | Yaung |
| 2003/0023413 A1 | 1/2003 | Srinivasa |
| 2003/0033432 A1 | 2/2003 | Simpson et al. |
| 2003/0091055 A1 | 5/2003 | Craddock et al. |
| 2003/0126240 A1 | 7/2003 | Vosseler |
| 2003/0204804 A1 | 10/2003 | Petri et al. |
| 2004/0006745 A1 | 1/2004 | Van Heldan et al. |
| 2004/0041838 A1 | 3/2004 | Adusumilli et al. |
| 2004/0073529 A1 | 4/2004 | Stanfill |
| 2004/0093559 A1 | 5/2004 | Amaru et al. |
| 2004/0098452 A1 | 5/2004 | Brown et al. |
| 2004/0107414 A1 | 6/2004 | Bronicki et al. |
| 2004/0111469 A1 | 6/2004 | Manion et al. |
| 2004/0148373 A1 | 7/2004 | Childress et al. |
| 2004/0177099 A1 | 9/2004 | Ganesh et al. |
| 2004/0205726 A1 | 10/2004 | Chedgey et al. |
| 2004/0207665 A1 | 10/2004 | Mathur |
| 2004/0210831 A1 | 10/2004 | Feng et al. |
| 2004/0225657 A1 | 11/2004 | Sarkar |
| 2004/0260590 A1 | 12/2004 | Golani et al. |
| 2005/0021689 A1 | 1/2005 | Marvin et al. |
| 2005/0033720 A1 | 2/2005 | Verma et al. |
| 2005/0034112 A1 | 2/2005 | Stanfill |
| 2005/0039176 A1 | 2/2005 | Fournie |
| 2005/0059046 A1 | 3/2005 | Labrenz et al. |
| 2005/0086360 A1 | 4/2005 | Mamou et al. |
| 2005/0097515 A1 | 5/2005 | Ribling |
| 2005/0097561 A1 | 5/2005 | Schumacher et al. |
| 2005/0102325 A1 | 5/2005 | Gould et al. |
| 2005/0102670 A1 | 5/2005 | Bretl et al. |
| 2005/0114778 A1 | 5/2005 | Branson et al. |

(56) References Cited

U.S. PATENT DOCUMENTS

| | | |
|---|---|---|
| 2005/0144277 A1 | 6/2005 | Flurry et al. |
| 2005/0144596 A1 | 6/2005 | McCullough et al. |
| 2005/0149935 A1 | 7/2005 | Benedetti |
| 2005/0172268 A1 | 8/2005 | Kuturiano et al. |
| 2005/0177531 A1 | 8/2005 | Bracewell |
| 2005/0193056 A1 | 9/2005 | Schaefer et al. |
| 2005/0216421 A1 | 9/2005 | Barry et al. |
| 2005/0240621 A1 | 10/2005 | Robertson et al. |
| 2005/0262470 A1 | 11/2005 | Gavrilov |
| 2005/0289527 A1 | 12/2005 | Illowsky et al. |
| 2006/0085462 A1 | 4/2006 | Todd |
| 2006/0095722 A1 | 5/2006 | Biles et al. |
| 2006/0098017 A1 | 5/2006 | Tarditi et al. |
| 2006/0130041 A1 | 6/2006 | Pramanick et al. |
| 2006/0206872 A1 | 9/2006 | Krishnaswamy |
| 2006/0282474 A1 | 12/2006 | MacKinnon |
| 2006/0294150 A1 | 12/2006 | Stanfill et al. |
| 2006/0294459 A1 | 12/2006 | Davis et al. |
| 2007/0011668 A1 | 1/2007 | Wholey et al. |
| 2007/0022077 A1 | 1/2007 | Stanfill |
| 2007/0035543 A1 | 2/2007 | David et al. |
| 2007/0094211 A1 | 4/2007 | Sun et al. |
| 2007/0118839 A1 | 5/2007 | Berstis et al. |
| 2007/0139441 A1 | 6/2007 | Lucas et al. |
| 2007/0143360 A1 | 6/2007 | Harris et al. |
| 2007/0150429 A1 | 6/2007 | Huelsman et al. |
| 2007/0174185 A1 | 7/2007 | McGovern |
| 2007/0179923 A1 | 8/2007 | Stanfill |
| 2007/0198971 A1 | 8/2007 | Dasu |
| 2007/0239766 A1 | 10/2007 | Papaefstathiou et al. |
| 2007/0271381 A1 | 11/2007 | Wholey et al. |
| 2007/0271562 A1 | 11/2007 | Schumacher et al. |
| 2007/0279494 A1 | 12/2007 | Aman et al. |
| 2007/0285440 A1 | 12/2007 | MacInnis et al. |
| 2008/0049022 A1 | 2/2008 | Sherb et al. |
| 2008/0126755 A1 | 5/2008 | Wu et al. |
| 2008/0134138 A1 | 6/2008 | Chamieh |
| 2008/0244524 A1 | 10/2008 | Kelso |
| 2008/0250049 A1 | 10/2008 | Chakra et al. |
| 2008/0288608 A1 | 11/2008 | Johnson |
| 2008/0288856 A1 | 11/2008 | Goranson |
| 2008/0294615 A1 | 11/2008 | Furuya et al. |
| 2009/0030863 A1 | 1/2009 | Stanfill et al. |
| 2009/0064147 A1 | 3/2009 | Beckerle et al. |
| 2009/0083313 A1 | 3/2009 | Stanfill et al. |
| 2009/0113196 A1 | 4/2009 | Jan et al. |
| 2009/0182728 A1 | 7/2009 | Anderson |
| 2009/0193391 A1 | 7/2009 | Miller et al. |
| 2009/0193417 A1 | 7/2009 | Kahlon |
| 2009/0224941 A1 | 9/2009 | Kansal et al. |
| 2009/0235267 A1* | 9/2009 | McKinney et al. ........... 718/104 |
| 2009/0245426 A1 | 10/2009 | Ratnaker et al. |
| 2009/0313625 A1* | 12/2009 | Sharoff ............... G06F 11/3414 718/100 |
| 2009/0327196 A1 | 12/2009 | Studer et al. |
| 2010/0042976 A1* | 2/2010 | Hines .......................... 717/127 |
| 2010/0070955 A1 | 3/2010 | Kahlon |
| 2010/0169137 A1 | 7/2010 | Jastrebski et al. |
| 2010/0174694 A1 | 7/2010 | Staebler et al. |
| 2010/0180344 A1 | 7/2010 | Malyshev et al. |
| 2010/0211953 A1 | 8/2010 | Wakeling et al. |
| 2010/0218031 A1 | 8/2010 | Agarwal et al. |
| 2010/0281462 A1* | 11/2010 | Festa ........................... 717/108 |
| 2010/0281488 A1 | 11/2010 | Krishnamurthy et al. |
| 2011/0078500 A1 | 3/2011 | Douros et al. |
| 2011/0093433 A1 | 4/2011 | Stanfill et al. |
| 2011/0307897 A1* | 12/2011 | Atterbury et al. ............ 718/102 |
| 2012/0023508 A1 | 1/2012 | Flores et al. |
| 2012/0036498 A1* | 2/2012 | Akirekadu et al. ........... 717/124 |
| 2012/0054255 A1 | 3/2012 | Buxbaum |
| 2012/0151419 A1 | 6/2012 | Kent et al. |
| 2012/0216176 A1 | 8/2012 | Gaikwad et al. |
| 2012/0233599 A1 | 9/2012 | Valdiviezo Basauri et al. |
| 2012/0266074 A1 | 10/2012 | Bhoovaraghavan et al. |
| 2013/0167241 A1 | 6/2013 | Siman |
| 2013/0290928 A1 | 10/2013 | Johnson |
| 2014/0068566 A1* | 3/2014 | Coronado et al. ............ 717/127 |
| 2015/0160926 A1 | 6/2015 | Larson et al. |
| 2015/0160927 A1 | 6/2015 | Stevens et al. |

FOREIGN PATENT DOCUMENTS

| | | |
|---|---|---|
| EP | 0834810 | 4/1998 |
| JP | 64-013189 | 1/1989 |
| JP | H01-094431 | 4/1989 |
| JP | 06-236276 | 8/1994 |
| JP | H08-106540 | 4/1996 |
| JP | 08-278892 | 10/1996 |
| JP | 08-305576 | 11/1996 |
| JP | 63-231613 | 9/1998 |
| JP | 11-184766 | 7/1999 |
| JP | 2000-010788 | 1/2000 |
| JP | 2000-99317 | 4/2000 |
| JP | 2000-514219 | 10/2000 |
| JP | 2001-022571 | 1/2001 |
| JP | 2002-229943 | 8/2002 |
| JP | 2005-317010 | 11/2005 |
| JP | 2006-504160 | 2/2006 |
| JP | 2006-133986 | 5/2006 |
| WO | WO 98/00791 | 1/1998 |
| WO | WO 02/11344 | 2/2002 |
| WO | WO2005/001687 | 1/2005 |
| WO | WO 2005/086906 | 9/2005 |
| WO | WO 2008/124319 | 10/2008 |
| WO | WO 2009/039352 | 3/2009 |

OTHER PUBLICATIONS

International Search Report & Written Opinion received in PCT application No. PCT/US2013/076416, mailed Apr. 9, 2014, 10 pages.

Mattson et al., "Patterns for Parallel Programming," Addison-Wesley Professional ISBN: 0-321-22811-1 (2004).

Babaoglu, O et al., "Mapping parallel computations onto distributed systems in Paralex" Compuero '91. Advanced Computer Technology, Reliable Systems and Applications. 5th Annual European Computer Conference. Proceedings. Bologna, Italy May 13-16, 1991, Los Alamitos, CA, USA, IEEE Comput. Soc, US, May 13, 1991, pp. 123-130.

Baer, J.L. et al., "Legality and Other Properties of Graph Models of Computations." Journal of the Association for Computing Machinery, vol. 17, No. 3, Jul. 1970, pp. 543-554.

Bookstein, A. et al., "Modeling Word Occurrences for the Compression of Concordances." ACM Transactions on Information Systems, vol. 15, No. 3, Jul. 1997, pp. 254-290.

Burch, J.R. et al., "Sequential circuit verification using symbolic model checking." In Design Automation Conference, 1990, Proceedings of the 27th ACM/IEEE. Jun. 24-28, 1990, pp. 46-51.

Control-M; New Dimension Software. User Manual. New Dimension Software Ltd., 1999.

Cytron, Ron et al., "Efficiently Computing Static Single Assignment Form and the Control Dependence Graph." ACM Transactions on Programming Languages and Systems, vol. 13, No. 4, Oct. 1991, pp. 451-490.

Ebert, Jurgen et al., "A Declarative Approach to Graph-Based Modeling." Workshop on Graph-Theoretic Concepts in Computer Science, 1994, pp. 1-19.

European Search Report issued in application No. EP10003554, dated Sep. 24, 2010, 7 pages.

European Search Report issued in application No. EP10741775, dated Nov. 14, 2012, 4 pages.

Gamma et al. "Design Patterns: Elements of Reusable Object-Oriented Software", Sep. 1999.

Guyer et al., "Finding Your Cronies: Static Analysis for Dynamic Object Colocation." Oct. 2004, ACM, pp. 237-250.

Grove et al., "A Framework for Call Graph Construction Algorithms." Nov. 2001, ACM TOPLAS, vol. 23, Issue 6, pp. 685-746.

Herniter, Marc E., "Schematic Capture with MicroSim PSpice," 2nd Edition, Prentice Hall, Upper Saddle River, N.J., 1996, pp. 51-52, 255-280, 292-297.

(56) References Cited

OTHER PUBLICATIONS

International Search Report & Written Opinion issued in PCT application No. PCT/US01/23552, mailed Jan. 24, 2002, 5 pages.
International Search Report & Written Opinion issued in PCT application No. PCT/US06/24957, dated Jan. 17, 2008, 14 pages.
International Search Report & Written Opinion issued in PCT application No. PCT/US07/75576, mailed Sep. 16, 2008, 13 pages.
International Search Report & Written Opinion issued in PCT application No. PCT/US08/71206, mailed Oct. 22, 2008, 12 pages.
International Search Report & Written Opinion issued in PCT application No. PCT/US10/49966, dated Nov. 23, 2010, 8 pages.
International Search Report & Written Opinion received in PCT application No. PCT/US10/24036, mailed Mar. 23, 2010, 11 pages.
International Search Report & Written Opinion received in PCT application No. PCT/US2011/040440, mailed Oct. 12, 2011, 13 pages.
Japanese Office Action, with English Translation, JP application No. 2008-519474, mailed Sep. 25, 2012, 8 pages.
Japanese Office Action, with English Translation, JP application No. 2009-523997, mailed Oct. 23, 2012, 7 pages.
Japanese Office Action, with English Translation, JP application No. 2011-000948, mailed Jan. 8, 2013, 11 pages.
Jawadi, Ramamohanrao et al., "A Graph-based Transaction Model for Active Databases and its Parallel Implementation." U. Florida Tech. Rep TR94-0003, 1994, pp. 1-29.
Just et al., "Review and Analysis of Synthetic Diversity for Breaking Monocultures." Oct. 2004, ACM, pp. 23-32.
Kebschull, U. et al., "Efficient Graph-Based Computation and Manipulation of Functional Decision Diagrams." University of Tubingen, 1993 IEEE, pp. 278-282.
Krahmer et al., "Graph-Based Generation of Referring Expressions." Mar. 2003, MIT Press, vol. 29, No. 1, pp. 53-72.
Krsul, Ivan et al., "VMPlants: Providing and Managing Virtual Machine Execution Environments for Grid Computing." Proceedings of the ACM/IEEE SC2004 Conference on Supercomputing, 2001, Nov. 6-12, 2004, 12 pages.
Li, Xiqing et al., "A Practical External Sort for Shared Disk MPPs." Proceedings of Supercomputing '93, 1993, 24 pages.
Martin, David et al., "Models of Computations and Systems—Evaluation of Vertex Probabilities in Graph Models of Computations." Journal of the Association for Computing Machinery, vol. 14, No. 2, Apr. 1967, pp. 281-299.
Ou, Chao-Wei et al., "Architecture-Independent Locality-Improving Transformations of Computational Graphs Embedded in k-Dimensions." Proceedings of the $9^{th}$ International Conference on Supercomputing, 1995, pp. 289-298.
"RASSP Data Flow Graph Design Application Note." International Conference on Parallel Processing, Dec. 2000, Retrieved from Internet <http://www.atl.external.lmco.com/projects/rassp/RASSP_legacy/appnotes/FLOW/APNOTE_FLOW_02>, 5 pages.
Romberg, M., "UNICORE: Beyond Web-based Job-Submission," Proceedings of the 42nd Cray User Group Conference, Noordwijk (May 22-26, 2000).
Russell, Nick, et al., "Workflow Control-Flow Patterns a Revised View," Workflow Patterns Initiative, 2006, pp. 1-134.
Shoten, Iwanami, "Encyclopedic Dictionary of Computer Science," (with English Translation), May 25, 1990, p. 741.
Stanfill, Craig, "Massively Parallel Information Retrieval for Wide Area Information Servers." 1991 IEEE International Conference on Systems, Man and Cybernetics, Oct. 1991, pp. 679-682.
Stanfill, Craig et al., "Parallel Free-Text Search on the Connection Machine System." Communications of the ACM, vol. 29, No. 12, Dec. 1986, pp. 1229-1239.
Stanfill, Craig, "The Marriage of Parallel Computing and Information Retrieval." IEE Colloquium on Parallel Techniques for Information Retrieval, Apr. 1989, 5 pages.
Supplemental European Search Report issued in application No. EP07813940, dated Nov. 26, 2009, 7 pages.
Supplemental European Search Report issued in application No. EP08796632, dated Sep. 24, 2010, 6 pages.
Supplemental European Search Report issued in application No. EP06774092, dated Dec. 19, 2012, 5 pages.
"Topological sorting," Wikipedia, accessed Dec. 10, 2012, 2 pages.
"Unicenter AutoSys Job Management," Computer Associates, Copyright 2001.
van der Aalst, W.M.P., et al., "Workflow Patterns," Distributed and Parallel Databases, 14, 5-51, 2003.
Vajracharya, Suvas et al., "Asynchronous Resource Management." Proceedings of the $15^{th}$ International Parallel and Distributed Processing Symposium, Apr. 2001, 10 pages.
Wah, B.W. et al., "Report on Workshop on High Performance Computing and Communications for Grand Challenge Applications: Computer Vision, Speech and Natural Language Processing, and Artificial Intelligence." IEEE Transactions on Knowledge and Data Engineering, vol. 5, No. 1, Feb. 1993, 138-154.
"Visual Lint: Squash Bugs Early with Interactive C/C++, C# and Java Code Analysis for Microsoft Visual Studio and Eclipse," [ retrieved from the internet Dec. 3, 2012: www.riverblade.co.uk/products/visual_lint.] (2 pages).
Japanese Office Action, with English Translation, JP application No. 2010-518415, mailed Feb. 21, 2013, 11 pages.
Dillon, Laura K., et al., "Inference Graphs: A Computational Structure Supporting Generation of Customizable and Correct Analysis Components," IEEE Transactions on Software Engineering, vol. 29, No. 2, Feb. 2003, pp. 133-150.
Evripidou, Paraskevas, et al., "Incorporating input/output operations into dynamic data-flow graphs," Parallel Computing 21 (1995) 1285-1311.
Extended European Search Report, EP 12165575, mailed May 10, 2013, 9 pages.
Frankl, Phyllis G., et al., "An Applicable Family of Data Flow Testing Criteria," IEEE Transactions on Sofrware Engineering, vol. 14, No. 10, Oct. 1988, pp. 1483-1498.
Whiting, Paul G., et al., "A History of Data-Flow Languages," IEEE Annals of the History of Computing, vol. 16, No. 4, 1994, pp. 38-59.
Transaction History, U.S. Appl. No. 09/627,252.
Transaction History, U.S. Appl. No. 10/268,509.
Transaction History, U.S. Appl. No. 11/467,724.
Transaction History, U.S. Appl. No. 11/733,579.
Transaction History, U.S. Appl. No. 11/169,014.
Transaction History, U.S. Appl. No. 11/167,902.
Transaction History, U.S. Appl. No. 12/977,545.
Transaction History, U.S. Appl. No. 11/836,349.
Transaction History, U.S. Appl. No. 12/180,141.
Transaction History, U.S. Appl. No. 12/704,998.
Transaction History, U.S. Appl. No. 13/161,010.
Transaction History, U.S. Appl. No. 12/638,588.
Transaction History, U.S. Appl. No. 13/678,928.
Japanese Office Action for Japanese Application No. 2010-518415, with English Translation, dated Nov. 18, 2013, 11 pages.
De Pauw et al., "Web Services Navigator: visualizing the execution of Web Services," XP2477231, ISSN: 0018-8670, Jan. 1, 2005.
European Examination report issued in EP 06 785 623.7 on Nov. 24, 2014, 5 pages.
Chinese Office Action issued in CN 201180039226.7, issued May 4, 2015.
International Search Report and Written Opinion, PCT/US2014/068754, mailed May 8, 2015 (17 pages).
Bernstein and Newcomer, "Principles of Transaction Processing, $2^{nd}$ Edition", Morgan Kaufmann, XP002739946 (Jul. 24, 2009).
Canadian Office Action in Application No. 2,750,279, dated Mar. 24, 2016 (5 pages).
Canadian Office Action in Application No. 2,801,573, dated Apr. 13, 2016 (5 pages).
Chinese Office Action (English Translation) in Application No. 2010-80042716.8, mailed Apr. 8, 2016 (14 pages).
Chinese Office Action (with English Translation) in Application No. 2006-800231781, dated Jan. 12, 2016, 15 pages.
Chinese Office Action in Application No. 200680023178.1, issued Apr. 14, 2016 (10 pages) (English translation).

(56) References Cited

OTHER PUBLICATIONS

Examination Report in Application No. IN 10117/DELNP/2007, dated Dec. 22, 2015 (2 pages).
Rajesh K. Gupta and Giovanni de Micheli—"A co-synthesis approach to embedded system design automation" Design Automation for Embedded Systems, vol. 1, issue 1-2, 69-120.
IBM: "Concepts and Architecture—Version 3.6," Internet citation, http://publibfp.boulder.ibm.com.epubs/pdf/h126857, retrieved Apr. 19, 2007.
Japanese Office Action (English Translation) in application No. JP2014-077798, mailed Nov. 11, 2015 (6 pages).
Japanese Office Action in Application No. 2014-159008, mailed May 31, 2015 (English Translation) (4 pages).
Japanese Office Action, with English Translation, JP application No. 2013-515468, mailed Jul. 24, 2015 (4 pages).
Karasawa, K.; Iwata, M.; and Terada, H.—"Direct generation of data-driven program for stream-oriented processing"—Published in: Parallel Architctures and Compilation Techniques., 1997. Proceedings , 1997 International Conference on; Nov. 10-14, 1997 San Francisco, CA—pp. 295-306.
Korean Office Action in Application No. 10-2011-7019122, dated Jan. 18, 2016 (9 pages).
Korean Office action in Application No. 10-2013-7001038, dated Dec. 11, 2015 (4 pages).
Korean Office Action in Application No. 10-2015-7008131, dated Apr. 1, 2016 (4 pages).
Supplemental European Search Report issued in EP 13 80 2160 on Jul. 6, 2016 (6 pages).
Supplemental European Search Report issued in EP10819444, on Jun. 3, 2015 (4 pages).
Examination Report in India Application 250CHENP2009, Aug. 31, 2016 (7 pages).

\* cited by examiner

FIG. 9

Details for Job Summary - - All Runs - -

Info | Metric Values

| Time | Metric | Value | Units | Hostname | Error |
|---|---|---|---|---|---|
| 10/04 08:00:12 | Total CPU | 0.37 | sec | | |
| 10/04 08:00:12 | Total executions | 60 | execution | | |
| 10/04 08:00:12 | Total failed executions | 0 | execution | | |
| 10/04 08:00:12 | Total read | 2 | kB | | |
| 10/04 08:00:12 | Total read, records | 60 | records | | |
| 10/04 08:00:12 | Total written | 1 | kB | | |
| 10/04 08:00:12 | Total written, records | 60 | records | | |

View Metric Definitions 900, 902, 904, 906

DYNAMIC GRAPH PERFORMANCE MONITORING

BACKGROUND

This description relates to monitoring performance metrics of dynamic graphs.

Computations can often be expressed as a data flow through a directed graph (called a "dataflow graph"), with components of the computation being associated with the vertices of the graph and data flows between the components corresponding to links (arcs, edges) of the graph. In a physical implementation of a system for executing such computations, data processing elements such as microprocessors executing suitable program instructions can be used to instantiate the component and data flow. The components can include data processing components that receive data at one or more input ports, process the data, and provide data from one or more output ports, and dataset components that act as a source or sink of the data flows. The components can also include one or more data graphs which can be loaded dynamically as data is executed in, for example, "dynamic components" or "micrographs". A system that implements such graph-based computations is described in U.S. Pat. No. 5,966,072, "Executing Computations Expressed as Graphs" and a system for implementing dynamic components in such graph based computations, is illustrated, for example, in U.S. patent application Ser. No. 13/161,010, "Dynamically Loading Graph-Based Computations."

SUMMARY

In one aspect, in general, a method for processing data includes receiving multiple units of work that each include one or more work elements. The method includes determining a characteristic of the first unit of work. The method includes identifying, by a component of the first dataflow graph, a second dataflow graph from multiple available dataflow graphs based on the determined characteristic, the multiple available dataflow graphs being stored in a data storage system. The method includes processing the first unit of work using the second dataflow graph. The method includes determining one or more performance metrics associated with the processing.

Aspects can include one or more of the following features. The second dataflow graph may be compiled independently of the first dataflow graph. The methods may include storing the one or more performance metrics in an in-memory data store. The methods may include transferring the stored one or more performance metrics to a persistent data store. The methods may include aggregating the one or more performance metrics with previously obtained performance metrics. Aggregating the one or more performance metrics may include aggregating the one or more performance metrics based on an identifier associated with the second dataflow graph. Aggregating the one or more performance metrics may include aggregating the one or more performance metrics based on an identifier associated with the first dataflow graph. The methods may include displaying the one or more performance metrics to a user.

Aspects can include one or more of the following advantages. Performance metrics for dynamic components may be collected and reported. The latency introduced by monitoring the performance of dynamic performance may be reduced.

Other features and advantages of the invention will become apparent from the following description, and from the claims.

DESCRIPTION OF DRAWINGS

FIG. 9 illustrates an example user interface that displays additional performance metrics.

DESCRIPTION

Dataflow graph systems are used where large volumes of data must be processed very fast. Monitoring the performance of a dataflow graph system enables users to identify components, individually or as a group, of the dataflow graph that can be improved or that may be performing improperly. For example, performance monitoring can enable a user to identify components that use excessive amounts of processor time, introduce latency delays, or are prone to failure. These components can be examined and modified in order to correct these deficiencies.

Dynamically loaded components (components which are selected and loaded at the time the dataflow graph executes) enhance the functionality of a dataflow graph by enabling new functionality to be introduced without re-compiling an existing graph. However, monitoring dynamically loaded components introduces additional complications.

In general, the creator of the dataflow graph may be unaware of the characteristics of subsequently introduced dynamic components, making such components difficult to monitor. Traditionally, a dataflow graph is unable to appropriately report the performance characteristics of these dynamic components.

At the same time, dynamic components are more likely to introduce performance problems. For example, the creator of a dynamic component may not be aware of nuances in the construction of the dataflow graph into which the component will be loaded. Therefore, the dynamic component may perform unnecessary operations or may adversely affect the processing or performance of the remainder of the dataflow graph.

By expanding the monitoring capabilities of dataflow graphs to account for dynamic components, the ability to monitor dataflow graph systems is improved.

Figure 1:
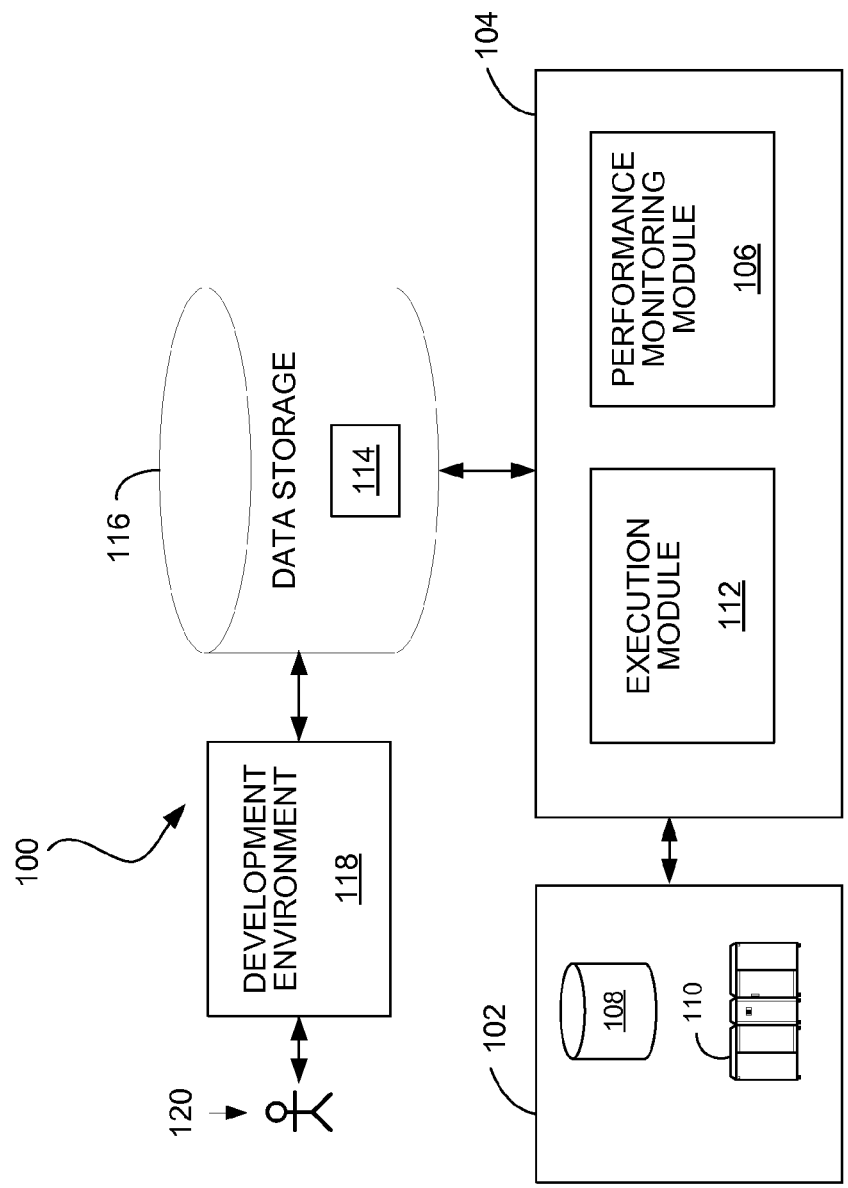
FIG. 1 is a block diagram of a system for executing graph-based computations.

FIG. 1 shows an exemplary data processing system 100 in which performance monitoring techniques can be used. The system 100 includes a data source 102 that may include one or more sources of data, such as storage devices or connections to online data streams, each of which may store data in any of a variety of storage formats (e.g., database tables, spreadsheet files, flat text files, or a native format used by a mainframe). An execution environment 104 includes a performance monitoring module 106 and an execution module 112. The execution environment 104 may be hosted on one or more general-purpose computers under the control of a suitable operating system, such as the UNIX operating system. For example, the execution environment 104 can include a multiple-node parallel computing environment including a configuration of computer systems using multiple central processing units (CPUs) (or, equivalently CPU "cores"), either local (e.g., multiprocessor systems such as symmetric multiprocessing (SMP) computers), or locally distributed (e.g., multiple processors coupled as clusters or massively parallel processing (MPPs), or remote, or remotely distributed (e.g., multiple processors coupled via one or more local area networks (LANs) and/or wide-area networks (WANs)), or any combination thereof.

The execution module 112 reads data from the data source 102. Storage devices providing the data source 102 may be local to the execution environment 104, for example, being stored on a storage medium connected to a computer running the execution environment 104 (e.g., hard drive 108), or may be remote to the execution environment 104, for example, being hosted on a remote system (e.g., mainframe 110) in communication with a computer running the execution environment 104, over a remote connection.

The execution module 112 uses the data from the data source 102 to generate output records 114 stored in a data storage system 116 accessible to the execution environment 104. The data storage system 116 is also accessible to a development environment 118. The development environment 118 is, in some implementations, a system for developing applications as dataflow graphs that include vertices (representing components or datasets) connected by directed links (representing flows of work elements) between the vertices. For example, such an environment is described in more detail in U.S. Publication No. 2007/0011668, titled "Managing Parameters for Graph-Based Applications," incorporated herein by reference. A system for executing such graph-based computations is described in U.S. Pat. No. 5,566,072, "Executing Computations Expressed as Graphs", incorporated herein by reference. As used herein, the terms "graph" and "micrograph" refer to a set of instructions and in association with a processor executing those instructions. Dataflow graphs made in accordance with this system provide mechanisms for getting information into and out of individual processes represented by graph components, for moving information between the processes, and for defining a running order for the processes. This system includes algorithms that choose interprocess communication methods (for example, communication paths according to the links of the graph can use TCP/IP or UNIX domain sockets or shared memory to pass data between the processes).

The execution module 112 can receive data from a variety of types of systems including different forms of database systems. The data may be organized as records having values for respective fields (also called "attributes" or "columns"), including possibly null values. When first reading data from a data source, the execution module 112 typically starts with some initial format information about records in that data source. In some circumstances, the record structure of the data source may not be known initially and may instead be determined after analysis of the data source. The initial information about records can include the number of bits that represent a distinct value, the order of fields within a record, and the type of value (e.g., string, signed/unsigned integer) represented by the bits.

Figure 2:
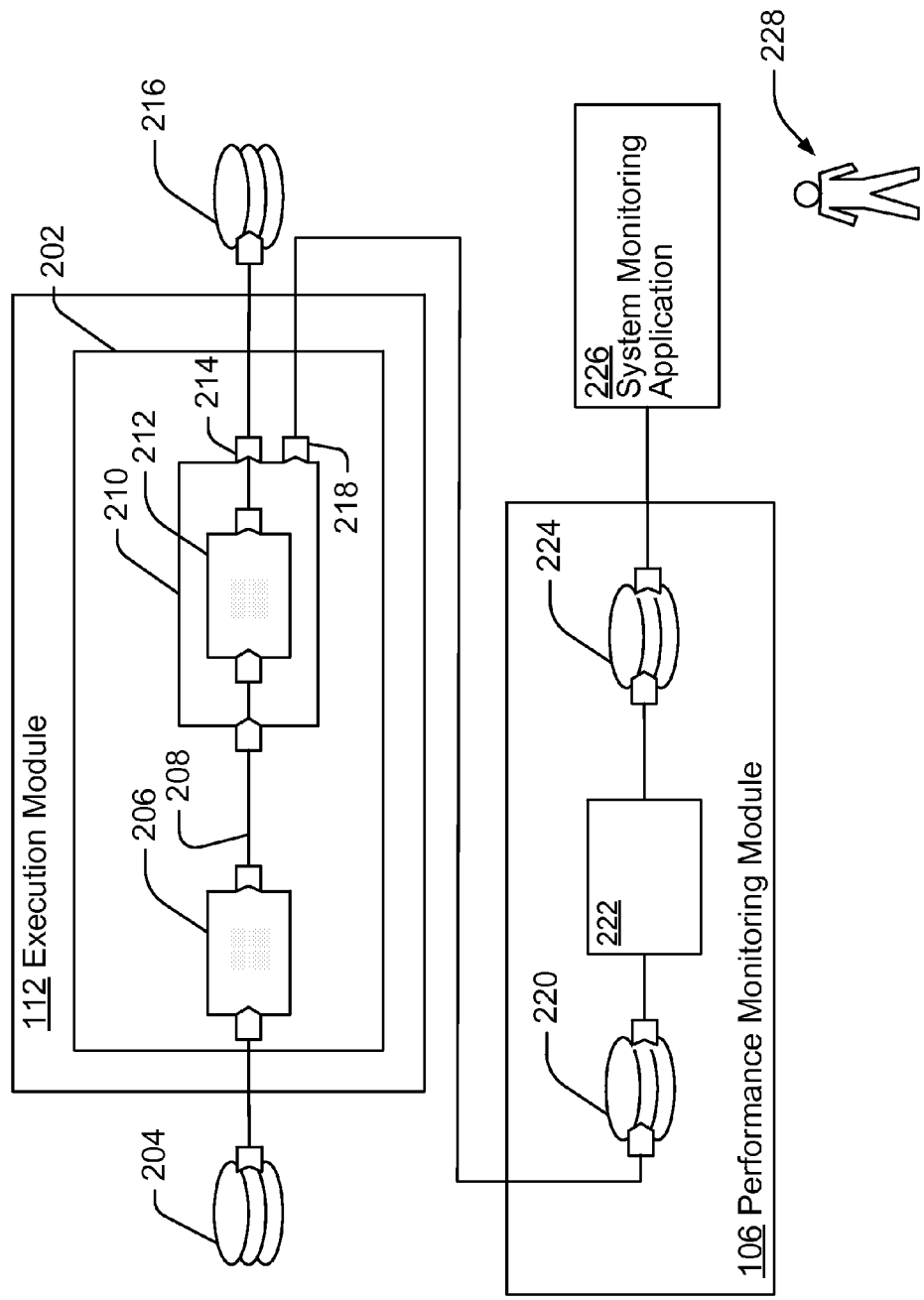
FIG. 2 shows an exemplary environment in which performance metrics for micrographs may be collected.

The performance monitoring module 106 collects performance metrics about the performance of the execution module 112. As discussed below, these metrics may include, for example, some or all of the number of records read, the number of bytes read, the number of records written, the number of bytes written, the processor time used, and the elapsed time. FIG. 2 shows an exemplary environment for collecting performance metrics of micrographs executed by an execution module. In general, a micrograph is a specialized sub-graph configured to be retrieved dynamically and embedded within the run-micrograph component 210. A system for executing such dynamically loaded graphs is described in U.S. patent application Ser. No. 13/161,010, "Dynamically Loading Graph-Based Computations", incorporated herein by reference. In some implementations, the micrograph may be precompiled.

The execution module 112 executes a graph 202. The execution module may be, for example, a process or set of processes being executed by a computer system. The graph may be a set of computer readable instructions which can be stored in a non-transitory computer readable storage device, such as the data storage 116. The graph 202 may be loaded from a data store, for example, the data storage 116 of FIG. 1.

In this example, the graph 202 includes a component 206 which reads data from a data source 204. The component 206 is connected to a run-micrograph component 210 by a link 208. Data records from the output port of the component 206 are passed into the input port of the run-micrograph component 210. In general, a port refers to any mechanism by which a component of a dataflow graph may receive or provide data. A port may be, for example, a Transmission Control Protocol (TCP)/Internet Protocol (IP) port, a network socket, or a software pipe. A port may also refer to other methods of communication between components such as, for example, reading and writing to shared memory.

The run-micrograph component 210 selects a micrograph 212 to execute. For example, a credit processing system may perform numerous actions on behalf of different users. The actions may include changing an address, raising a credit limit, and canceling a credit card. Each of these activities may be associated with a different code stored in a data record. A series of data records may include, for example, a first change of address from a first user, a second change of address from a second user, a cancel credit card request from a third user, a third change of address from a fourth user, and a raise credit limit request from a fifth user.

To process each of these records, one or more different micrographs 212 may be selected. For example, a change of address may be processed by a change of address micrograph, a cancel credit card may be processed by a cancel credit card micrograph, and a raise credit limit may be process by a raise credit limit micrograph. The micrographs may be stored in a data store and loaded dynamically at run-time. In some implementations, the micrographs may be pre-compiled dataflow graphs which are accessed by the run-micrograph component.

The run-micrograph component can produce output records on output port 214 and the output records can be stored in a data store 216.

The run-micrograph component 210 may monitor and record the performance characteristics of the micrograph 212. For example, the run-micrograph component 210 may collect performance metrics such as processor time used, elapsed time, number of bytes read, number of records read, number of bytes written, number of records written, number of executions, number of failed executions, total duration, average record processing rate (records/second), average byte processing rate (bytes/second), etc.

The performance metrics may be produced on a second output port 218 of the run-micrograph component 210. For example, the performance metrics may be one or more records that contain information about the performance of the selected micrograph 212 along with other selected micrographs.

The performance metrics can be stored in a data store 220 in the performance monitoring module 106. In some implementations, the data store 220 is selected to minimize the performance impact of writing the performance metrics. For example, it can be advantageous to reduce latency introduced by writing the performance metrics to the data store 220. In some implementations, the data store 220 may be located in shared memory 220. Operations which write to shared (e.g., semi-conductor) memory generally introduce less overhead and are consequently faster than similar operations writing to a persistent data store, such as a magnetic disk.

Periodically, for example, every five minutes, ten minutes, or thirty minutes, a transfer component 222 reads the performance metrics from the data store 220 and writes the performance metrics to a system monitoring log 224. In some implementations, the systems monitoring log can be located in a persistent data store.

A system monitoring component 226 can read the performance metrics from the data store 220 and can further process and aggregate the data. For example, the system monitoring application may combine the performance metrics associated with multiple dataflow graphs that together make up a single business transaction. The system monitoring application can present the performance metrics to a user 228. In general, each data record that is received by the run-micrograph component 210 may result in the loading and processing of a different micrograph, though a same micrograph may be used to process multiple data records.

Figure 3:
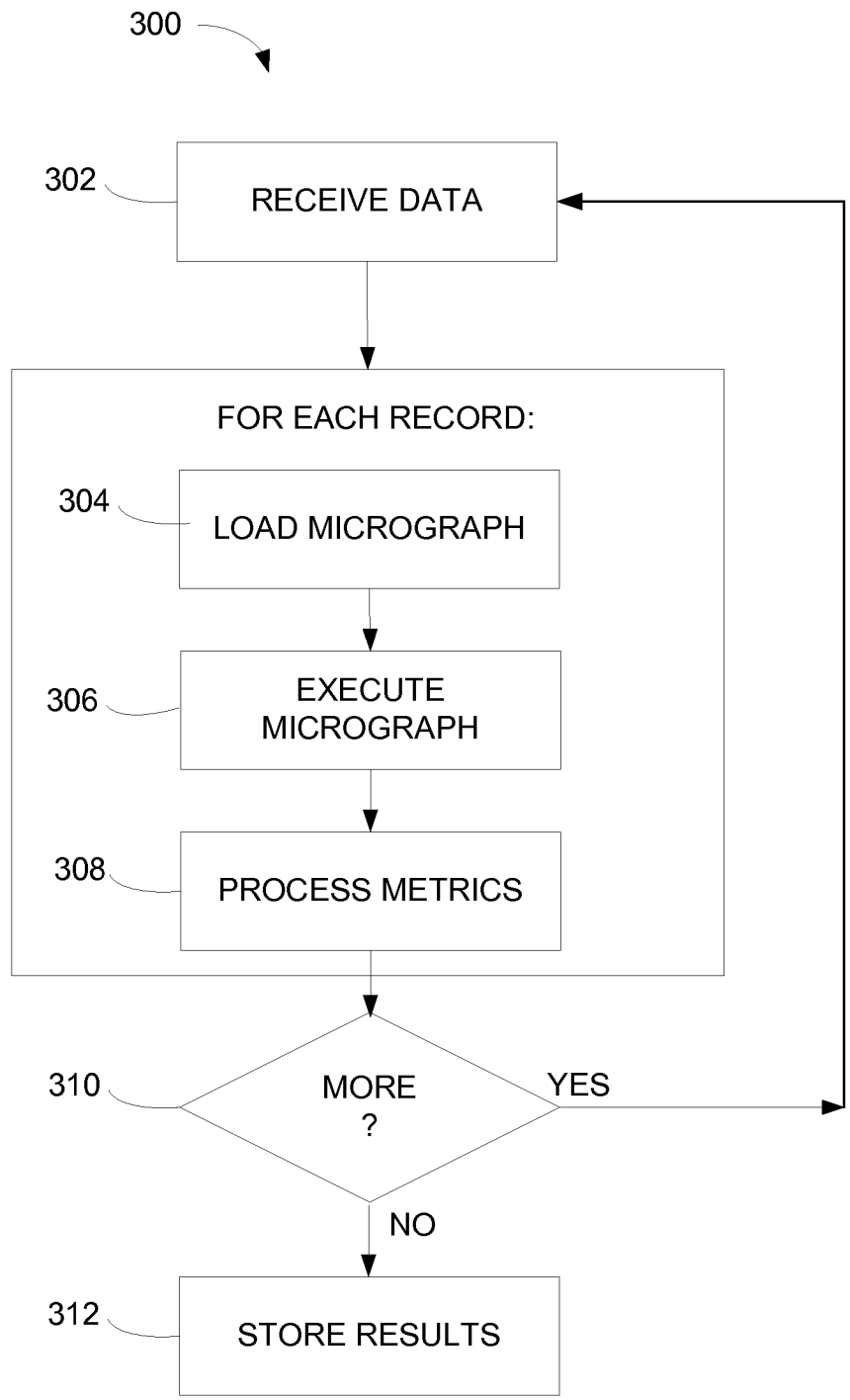
FIG. 3 is a flow chart for collecting performance metrics from a micrograph.

FIG. 3 is a flow chart for a process that collects performance metrics from micrographs that are loaded based on the contents of a data record. The process may be executed by an execution module, for example, the execution module 112 of FIG. 1.

Data is received, 302, for example on an input port of a run-micrograph component. In general, the data may be in the form of one or more records. The records may include one or more values which may correspond to one or more fields. For example, a credit card transaction data record may include four groups of four integer values (e.g., "1234 1234 1234 1234") which correspond to an account identifier field.

For each record, a micrograph may be loaded, 304; the micrograph may be executed, 306; and the metrics may be processed, 308.

The micrograph may be loaded from one or more locations or devices, such as a persistent data store, or may be stored in memory. Loading the micrograph may include selecting an appropriate micrograph to load, for example, by evaluating data comprising some of the data in the record. Based on the evaluation of the data contained in the record, the micrograph may be selected from one or more micrographs. For example, a particular field or combination of fields may be determinative of which micrograph to load.

In general, data that is used in the selection of the micrograph is referred to as control data. In some implementations, control data may be provided to the run-micrograph component in a separate data record from the data to be processed. In other implementations, the control data may be integrated into each data record and may in some instances also include data to be processed.

Micrographs may be compiled and stored in a data store. In some arrangements, a micrograph is, or is derived from, a data flow graph that was previously compiled and stored in the data storage system. In some arrangements, a micrograph remains in an un-compiled form when loaded from the data store. The micrograph can be compiled independently of the dataflow graph that includes the run-micrograph component.

Executing the micrograph, 306, can include providing the data record to an input port of the micrograph and receiving an output record from the output port of micrograph. In some implementations, the micrograph may receive zero or more data records and produce zero or more output records.

Processing the metrics, 308, can include determining the performance metrics for the micrograph (for example, processor time, elapsed byte, bytes read, and bytes written). The metrics may be aggregated. That is, the metrics may be summed across one or more executions of the micrograph. For example, the performance metrics can be aggregated based on the name or other label associated with the micrograph. For example, the performance of all executions of the "cancel credit card" micrograph may be combined. Additionally, a number of times the micrograph is executed may be tracked. The performance metrics may be stored in an in-memory data store.

Whether there are more records to be processed is determined at 310. For example, a micrograph may process multiple input records to produce a single output record. If the micrograph or the run-micrograph component requires additional records, the new records are received as data, 302. If no further records are required, then the output record is provided and stored, 312.

Performance metrics may be aggregated based on the run-micrograph component. That is, all executions for all micrographs by a particular run-micrograph component are aggregated. Performance metrics may also be aggregated, as described above, by a micrograph identifier. That is, all executions by a particular type of micrograph are aggregated. The micrograph identifier may be, for example, the name of the micrograph.

Performance metrics may also not be aggregated, but may be stored for each individual execution of a micrograph. In some implementations, the run-micrograph component may be configures to receive a user defined parameter which instructs how to aggregate the performance metrics.

Figure 4:
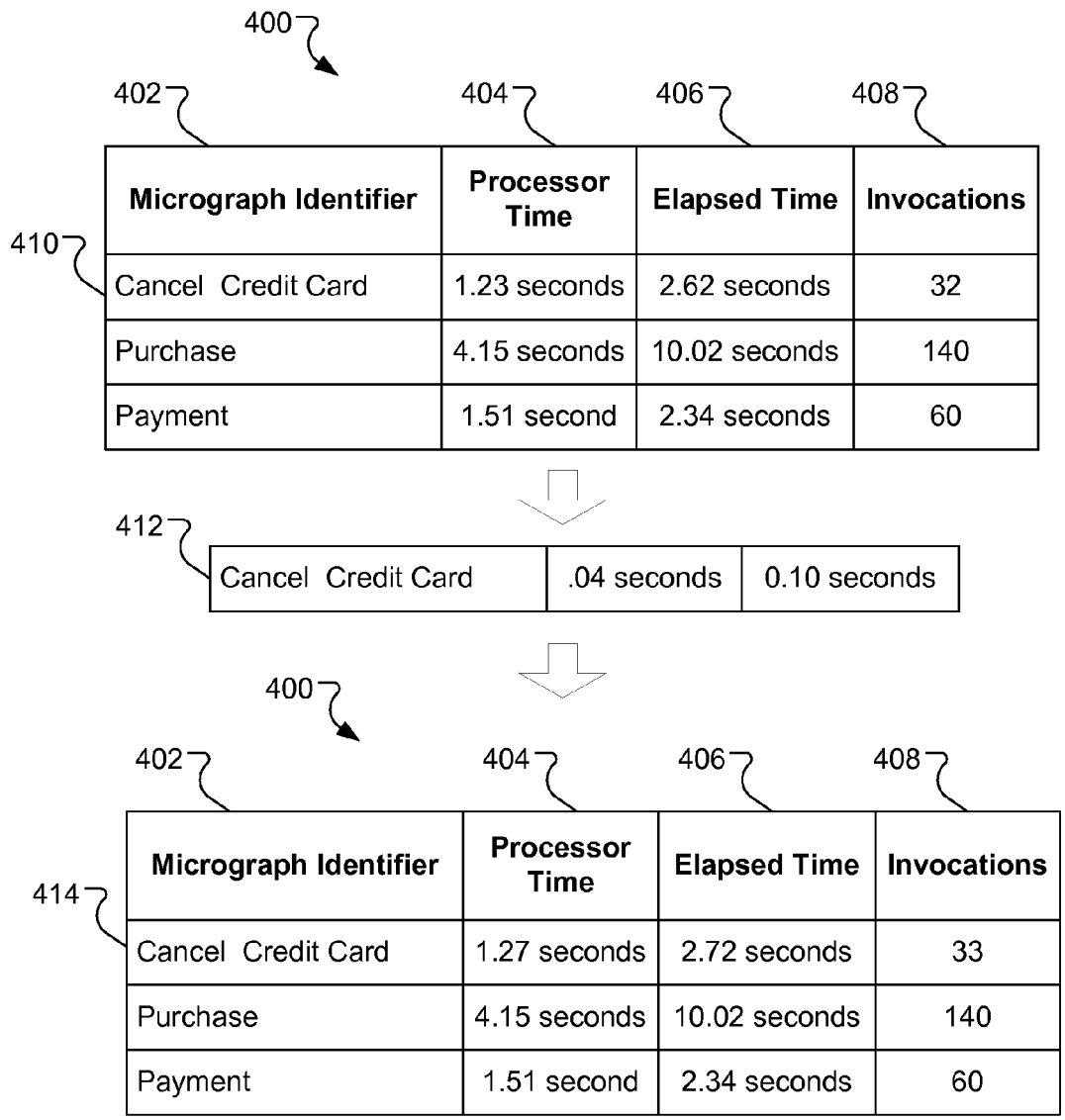
FIG. 4 illustrates an example of aggregating performance metrics by micrograph identifier.

As discussed above, performance metrics collected during the execution of a micrograph may be aggregated as the metrics are collected. FIG. 4 illustrates an example of aggregating performance metrics by micrograph identifier. The aggregated performance metrics may be used by a system monitoring application and displayed to a user. The table 400 may be located in a data store, for example, the data store 220 of FIG. 2. In this example, the table includes a "Micrograph Identifier" column 402, a "Processor Time" column 404, an "Elapsed Time" column 406 and an "Invocations" column 408. Initially, the table includes rows for an identifier of a "Cancel Credit Card" micrograph, an identifier of a "Purchase" micrograph, and an identifier of a "Payment" micrograph.

When a run-micrograph component, for example, the run-micrograph component 210 of FIG. 2, executes a micrograph, the table 400 may be updated. In this example, the table 400 is updated based on a new invocation of the "Cancel Credit Card" micrograph, represented by data record 412. The new invocation includes 0.04 seconds of processor time and 0.10 seconds elapsed time.

The "Cancel Credit Card" row 410 is read from the table 400 and updated with the information from the new invocation. In this example, the cumulative performance metrics for the "Cancel Credit Card" micrograph include 1.23 seconds of processor time and 2.62 seconds of elapsed time over 32 invocations. After the new record is added, the updated cancel credit card row 414 includes 1.27 seconds of processor time (1.23 seconds+0.04 seconds) and 2.72 seconds of elapsed time over 33 invocations.

In this manner, performance metrics may be aggregated during the execution of the micrograph. Aggregating the performance metrics can have the benefit of minimizing the amount of memory overhead required to store and manage the table 400.

Aggregating performance metrics is further complicated because different instances of the same dataflow graph may be executed in parallel. For example, multiple different machines may be executing and collecting performance metrics for different instances of the same micrograph concurrently.

Figure 5:
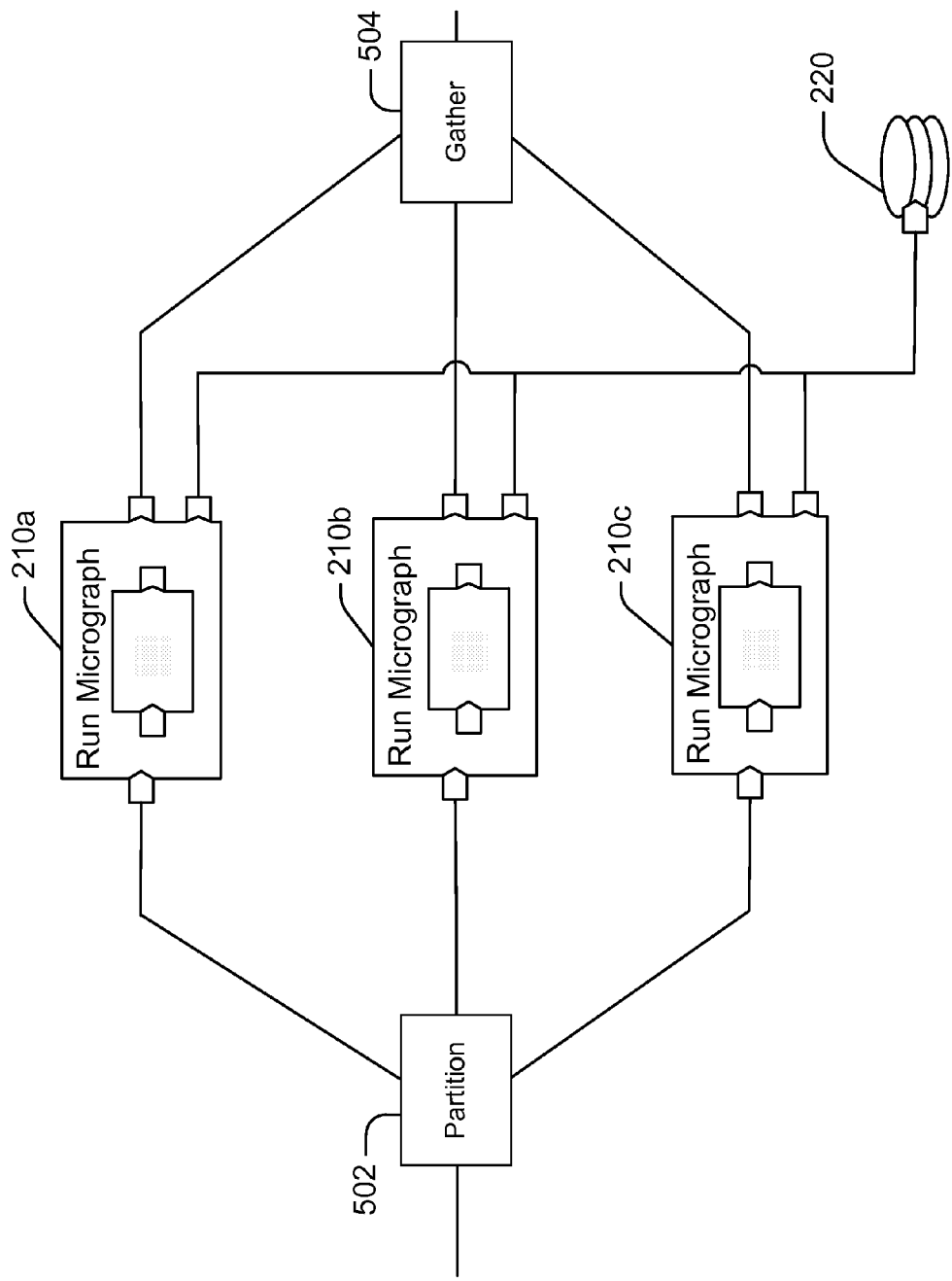
FIG. 5 illustrates an example environment in which run-micrograph components execute in parallel.

FIG. 5 illustrates an example environment in which run-micrograph components execute in parallel. Each instance of the run-micrograph component may be executed on one machine, a virtual machine, a processor, etc.

In this example, a partition element 502 divides a flow of input records between multiple instances of the run-micrograph component 210*a*, 210*b*, and 210*c*. Once the run-micrograph component processes an input record and produces an output record, the output records are collected by a gather element 504.

The performance metrics for each run-micrograph component may be delivered to the data store 220 and aggregated across each parallel instance, or may be stored separately for each parallel instance. In some implementations, the performance metrics for each parallel instance may be stored in a separate data store which is located on the same machine or device as the run-micrograph instance.

Figure 6:
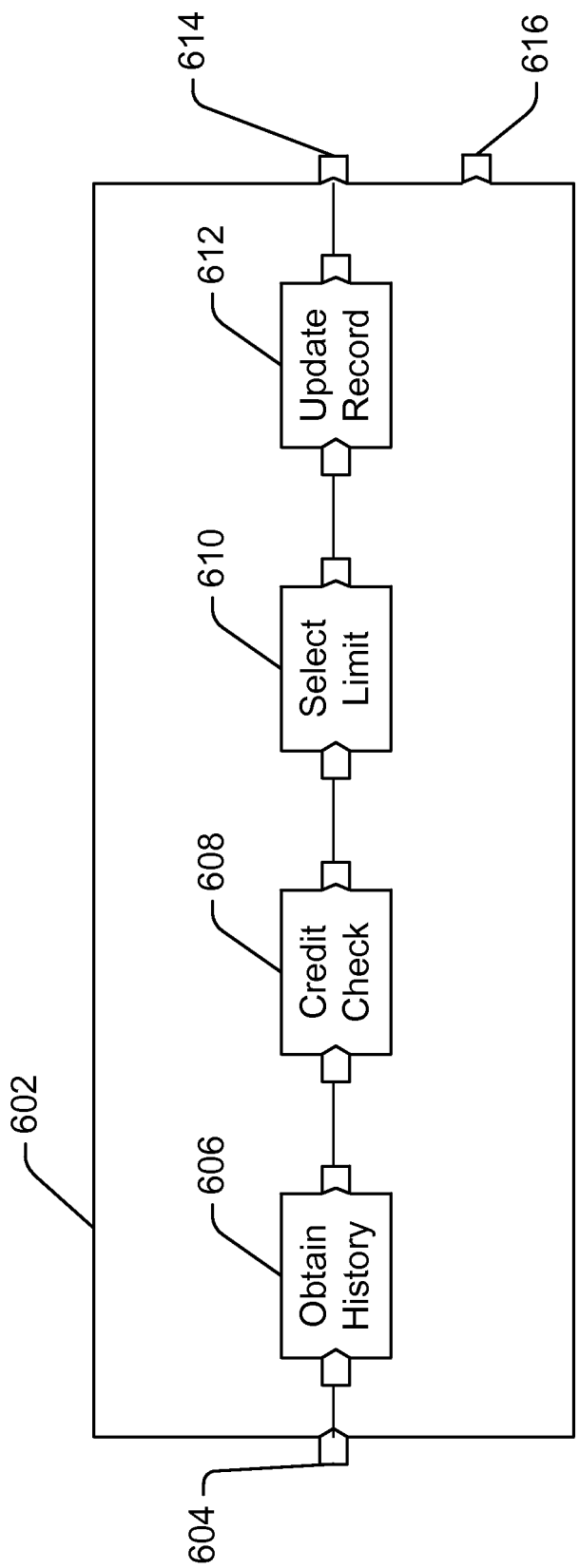
FIG. 6 illustrates an example of a micrograph for a "raise credit limit" transaction.

As a sub-graph, each micrograph may include multiple individual components that perform one or more distinct operations using a data record. In some implementations, micrographs may be instrumented to report additional information (e.g., more detailed information) about the performance of individual components of the micrograph. FIG. 6 illustrates an example of a micrograph for a "raise credit limit" transaction.

In this example, a "raise credit limit" micrograph 602 accepts input records on an input port 604. The "raise credit limit micrograph" 602 includes multiple components, such as an obtain history component 606 which obtains the payment history of a user requesting a credit limit increase; a credit check component 608 which checks the credit of the user; a select limit component 610 which selects a new credit limit based on the history and the credit check; and an update record component 612 which updates or creates an output record with the new credit limit. The output record is provided on an output port 614 of the micrograph 602.

The micrograph 602 may report the performance characteristics of its constituent components on a performance monitoring output port 616. For example, the "raise credit limit" micrograph 612 may report the processor time and elapsed time for the obtain history component 606, the credit check component 608, the select limit component 610 and the update record component 612. The run micrograph component (not shown) can collect and report these performance metrics based on an aggregation scheme as described above.

In some implementations, the run-micrograph component may request a list of the constituent components of the micrograph, for example, by sending a message through a dedicated input port (not shown). The run-micrograph component may provide the list of components on the performance monitoring output port 616. For example, in response to a request from the run-micrograph component (not shown) the "raise credit limit" micrograph may provide the comma-delimited list "obtain history, check credit, select limit, update record" on the performance metric port.

In some implementations, the run-micrograph component maintains a record of previously loaded micrographs. When a micrograph is loaded, the run-micrograph component may determine whether the micrograph has been previously loaded. If the micrograph has not been previously loaded, the run-micrograph component requests a list of the constituent components of the micrograph. The identity of the constituent components may be stored in the data store.

Once performance metrics are stored in a persistent data store, for example, the persistent data store 224 of FIG. 2 a performance monitoring application may access and use the stored performance metrics. In general, a performance monitoring application presents the collected metrics to a user in a manner that assists the user in understanding the metrics.

Figure 7:
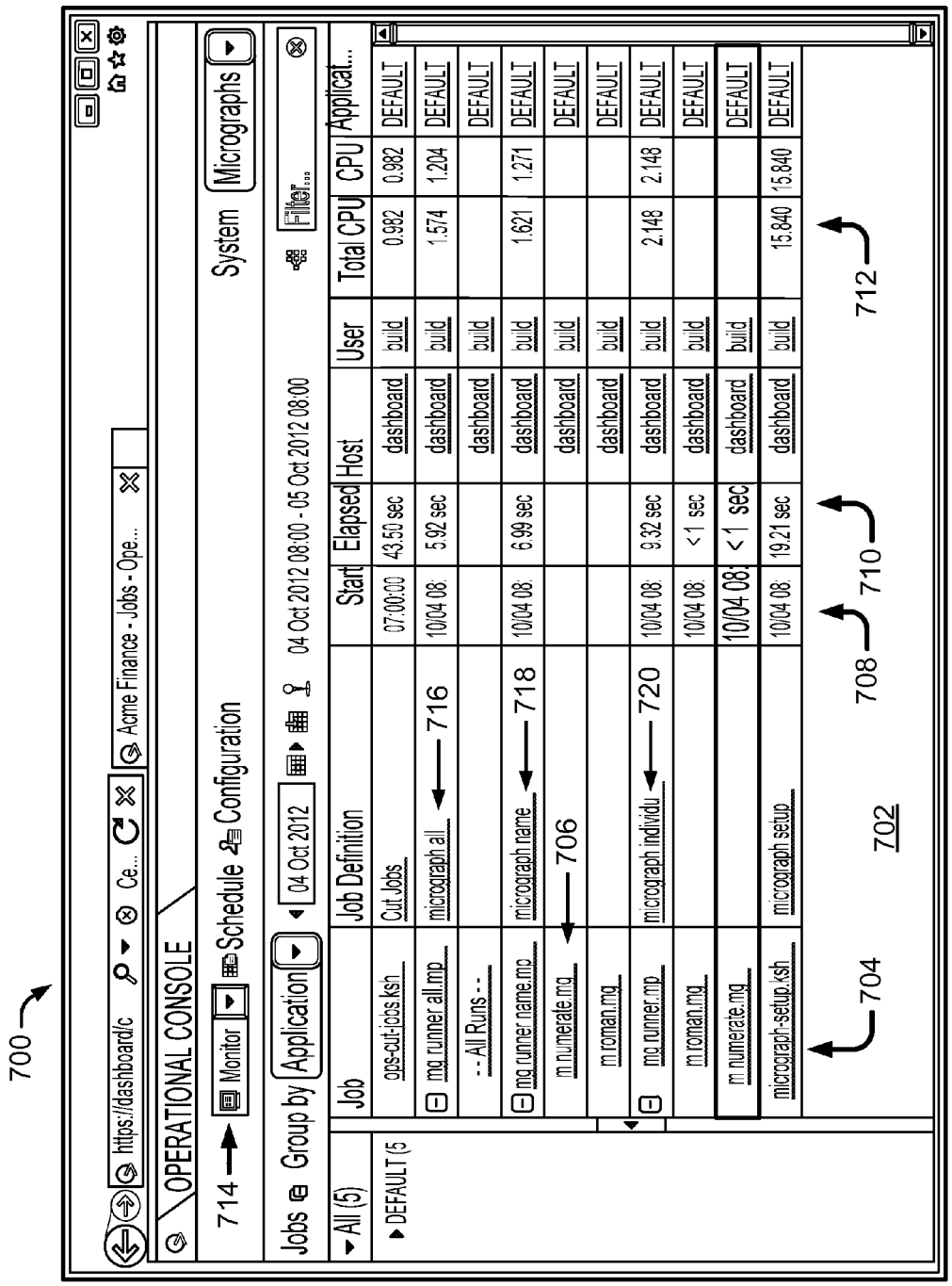
FIG. 7 illustrates an example user interface for the system monitoring application.

FIG. 7 illustrates an example user interface for a system for presenting collected performance metrics to a user. In this example, a user interface 700 presents a summary of data in a portion 702 of the user interface. The user interface 700 may be presented in one or more forms such as different types of network-based assets, for example, a web page displayed in a web browser on a user's computer system.

A monitor selector 714 enables a user to dynamically determine whether to monitor the execution of the micrographs. In some implementations, if a user elects not to monitor the execution of the micrograph, no performance metrics are collected. The monitor selector 714 may also allow the user to select how the performance metrics are aggregated. For example, the user may select to summarize the performance metrics for micrographs by micrograph name, to summarize the performance metrics across all micrographs, to store only the most recent execution of each micrograph, or to save the details of each execution of the micrograph.

In general, a job refers to processing a set of data records by one or more dataflow graphs. The performance metrics may be summarized differently for each job. For example, one micrograph 716 (titled "mg_runner_all.mp") is summarized across all micrograph executions. Another micrograph 718 (titled "mg_runner_name.mp") is summarized by its micrograph name. Still another micrograph 720 (titled "mg_runner.mp") records the performance metrics of each execution separately.

Performance metrics for each micrograph are obtained from the performance metrics stored in the persistent data store. For example, a start time 708 and elapsed time 710 are reported, as well as total processor time used 712.

Figure 8:
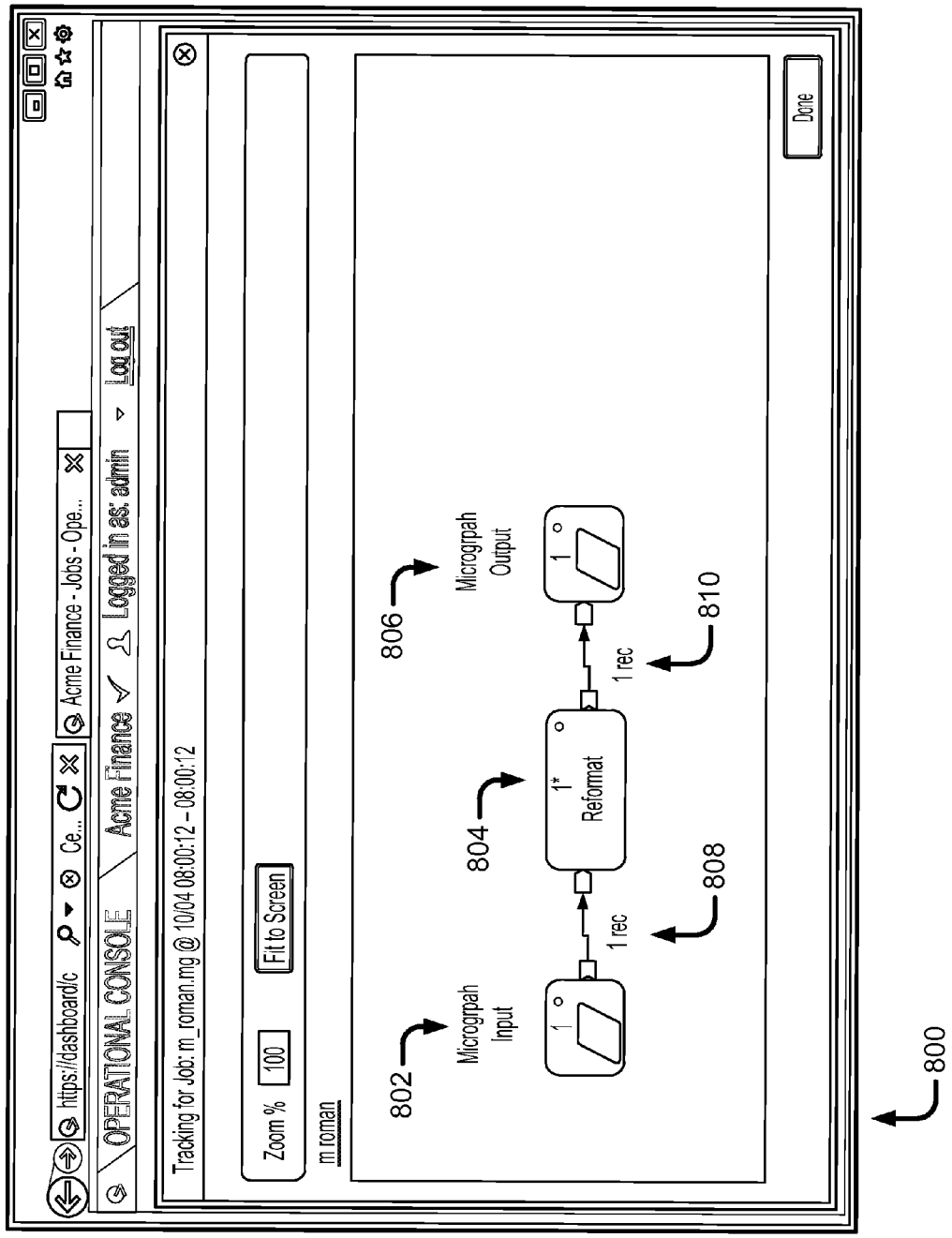
FIG. 8 illustrates an example user interface displaying a micrograph.

In some implementations, the user interface allows the user to expand and view the details of a particular job, micrograph, etc. FIG. 8 illustrates an example user interface 800 displaying a micrograph. In this example, a reformat micrograph 804 is displayed. An input port 802 for providing input records to the reformat micrograph 804 and an output port 806 for obtaining output records from the reformat micrograph 804 are also displayed.

Performance metrics are integrated into the user interface. In this example, the user interface displays that one record has been provided 808 to the micrograph and one record has been produced 810 by the micrograph.

FIG. 9 illustrates an example user interface that displays additional performance metrics. The user interface 900 presents the aggregated performance metrics in tabular form. A metrics column 902 lists the name of the metrics and a value column 904 provides a corresponding value for the metrics. A units column 906 provides the units which define the values 904. Included in the list of metrics are the number of times the micrograph executed and how many times the micrograph failed to complete the execution successfully.

Figure 10:
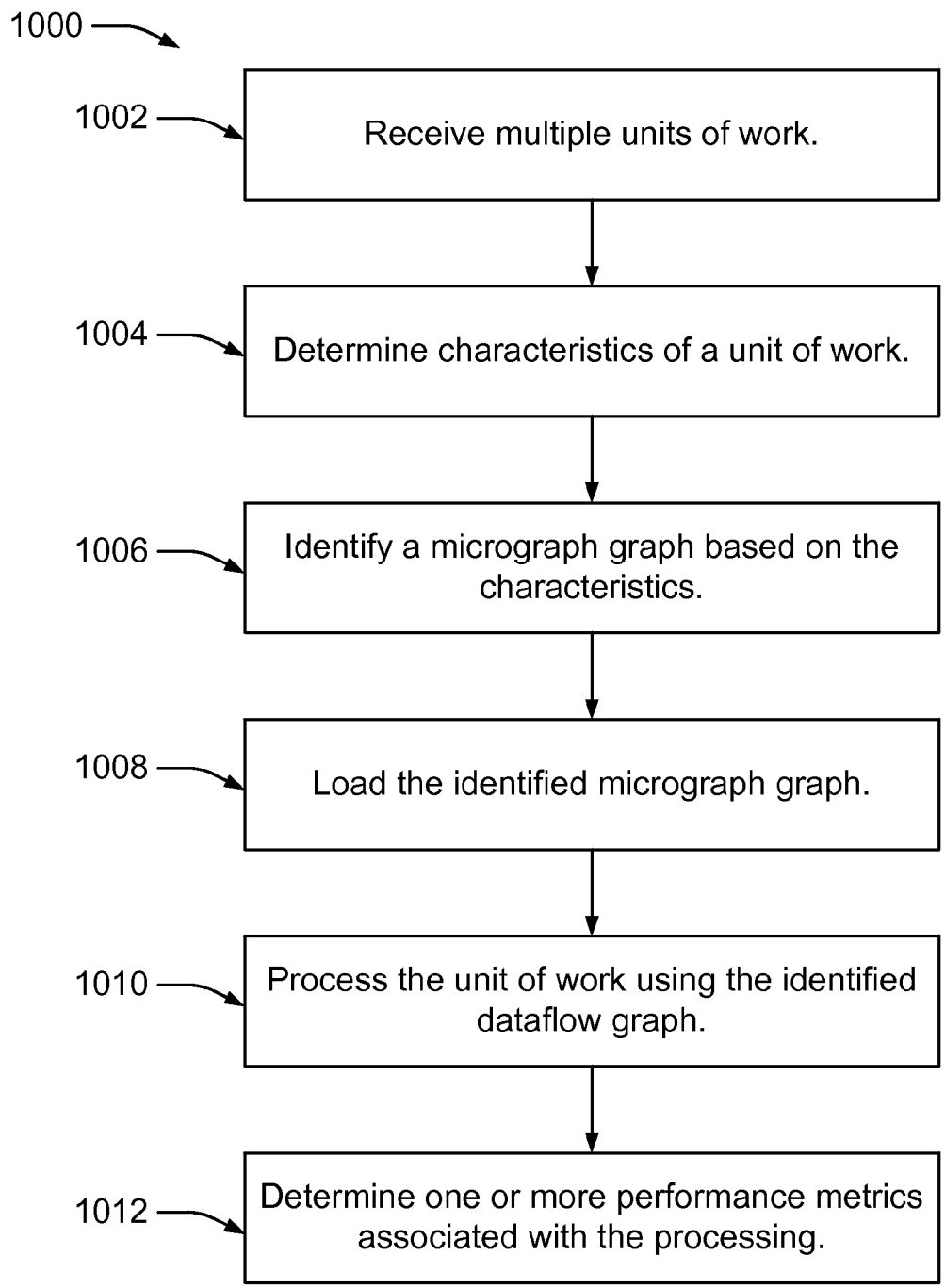
FIG. 10 is a flow chart for an example process for collecting performance metrics.

FIG. 10 is a flow chart of an example process for collecting performance metrics. The process 1000 may be performed by one or more computer systems including an execution module, for example, the execution module 104 of FIG. 1. For simplicity, the process will be described in relation to a system performing the process.

Multiple units of work are received, 1002. The units of work may be received by a component of a dataflow graph. A unit of work may include zero or more input data records. The input data records may be provided from a data store or from an output port of a preceding component in the dataflow graph.

Characteristics of a unit of work are determined, 1004. A characteristic may be one or more values stored in fields of one of the input data records. For example, a characteristic may be a value in a field which identifies an operation to be performed by the component of the dataflow graph.

A micrograph is identified based on the characteristics, 1006. For example, the process can identify a micrograph that performs the operation identified by the field. The micrograph may be identified by comparing the characteristics of the unit of work to a list of available micrographs, for example, by using a look up table, dictionary, or similar data structure.

The identified dataflow graph is loaded, 1008. A run-micrograph component may load the dataflow graph. The micrograph can be, for example, a data flow graph stored in a data store. The micrograph can be configured to be loaded and executed by a component of a data flow graph, for example, the run-micrograph component 222 of FIG. 2. In some arrangements, a micrograph remains in an un-compiled form when loaded from the data storage system. In some arrangements, the micrograph is serialized prior to being stored in the data storage system. In general, serialization is a process by which a dataflow graph, in a compiled or uncompiled form, is translated into a binary stream of zeroes and ones so that the dataflow graph is in a form that can easily be stored in a data store.

The unit of work is processed using the identified dataflow graph, 1010. In some implementations, the unit of work is provided on an input port of the identified micrograph. Generated output records, if any, are provided by an output port of the identified micrograph.

One or more performance metrics are determined, 1012. The performance metrics may be determined by a run-micrograph component or the micrograph may be instrumented to provide performance metrics on a specialized output port of the micrograph.

The performance monitoring approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, the software may provide other services related to the design and configuration of dataflow graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer, or delivered (encoded in a propagated signal) over a communication medium of a network to a storage medium of the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a tangible, non-transitory storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. It is to be understood that the foregoing description is intended to illustrate and not to limit the scope of the invention, which is defined by the scope of the appended claims. It will be understood that various modifications may be made without departing from the spirit and scope of the invention. For example, some of the steps described above may be order independent, and thus can be performed in an order different from that described. Other embodiments are within the scope of the following claims.

What is claimed is:

1. A method for processing data in a data processing system, wherein a first dataflow graph is executed, the method including:

receiving multiple units of work that each include one or more records;

determining a characteristic of a first unit of work based on data included in the one or more records of the first unit of work;

identifying, by a component of the first dataflow graph, a second dataflow graph from multiple available dataflow graphs based on the determined characteristic, the multiple available dataflow graphs being stored in a data storage system;

processing the first unit of work using the second dataflow graph based on loading the second dataflow graph into the first dataflow graph;

receiving, by the first dataflow graph, one or more values of one or more performance metrics associated with the processing of the first unit of work using the loaded second dataflow graph;

outputting, by the first dataflow graph to a performance monitoring module, the one or more received values of the one or more performance metrics associated with the processing of the first unit of work using the loaded second dataflow graph, wherein the performance monitoring module receives a plurality of values of one or more performance metrics output by a plurality of dataflow graphs;

selecting, from among the plurality of values of the one or more performance metrics output by the plurality of dataflow graphs, values of one or more performance metrics associated with an identifier for the second dataflow graph; and aggregating the values selected for the one or more performance metrics associated with the identifier for the second dataflow graph.

2. The method of claim 1, wherein the second dataflow graph is compiled independent of the first dataflow graph.

3. The method of claim 1, wherein the processing further includes storing the one or more values of the one or more performance metrics associated with the processing of the first unit of work using the loaded second dataflow graph in an in-memory data store.

4. The method of claim 3, wherein the processing further includes transferring the stored one or more values of the one or more performance metrics to a persistent data store.

5. The method of claim 1, wherein the values selected include first values and wherein the method further includes aggregating second values of the one or more performance metrics output by the plurality of dataflow graphs based on an identifier associated with the first dataflow graph.

6. The method of claim 1, further including displaying the one or more performance metrics to a user or displaying the aggregated values of the one or more performance metrics to the user.

7. A non-transitory computer-readable storage medium storing a computer program for processing data in a data processing system, wherein a first dataflow graph is executed, the computer program including instructions for causing a computing system to:

receive multiple units of work that each include one or more records;

determine a characteristic of a first unit of work based on data included in the one or more records of the first unit of work;

identify, by a component of the first dataflow graph, a second dataflow graph from multiple available dataflow graphs based on the determined characteristic, the multiple available dataflow graphs being stored in a data storage system;

process the first unit of work using the second dataflow graph based on loading the second dataflow graph into the first dataflow graph;

receive, by the first dataflow graph, one or more values of one or more performance metrics associated with the processing of the first unit of work using the loaded second dataflow graph;

output, by the first dataflow graph to a performance monitoring module, the one or more received values of the one or more performance metrics associated with the processing of the first unit of work using the loaded second dataflow graph, wherein the performance monitoring module receives a plurality of values of one or more performance metrics output by a plurality of dataflow graphs;

select, from among the plurality of values of the one or more performance metrics output by the plurality of dataflow graphs, values of one or more performance metrics associated with an identifier for the second dataflow graph; and aggregate the values selected for the one or more performance metrics associated with the identifier for the second dataflow graph.

8. The medium of claim 7, wherein the second dataflow graph is compiled independent of the first dataflow graph.

9. The medium of claim 7, wherein the computer program further includes instructions for causing a computing system to store the one or more values of the one or more performance metrics associated with the processing of the first unit of work using the loaded second dataflow graph in an in-memory data store.

10. The medium of claim 9, wherein the computer program further includes instructions for causing a computing system to transfer the stored one or more values of the one or more performance metrics to a persistent data store.

11. The medium of claim 7, wherein the values selected include first values and wherein the instructions to aggregate include instructions to aggregate second values of the one or more performance metrics output by the plurality of dataflow graphs based on an identifier associated with the first dataflow graph.

12. The medium of claim 7, wherein the computer program further includes instructions for causing a computing system to display the one or more performance metrics to a user or to display the aggregated values of the one or more performance metrics to the user.

13. A computing system for processing data, the computing system including:

an input device or port configured to receive multiple units of work that each include one or more records; and at least one processor configured to process data, the processing including:

receiving multiple units of work that each include one or more records;

determining a characteristic of a first unit of work based on data included in the one or more records of the first unit of work;

identifying, by a component of a first dataflow graph, a second dataflow graph from multiple available dataflow graphs based on the determined characteristic, the multiple available dataflow graphs being stored in a data storage system;

processing the first unit of work using the second dataflow graph based on loading the second dataflow graph into the first dataflow graph;

receiving, by the first dataflow graph, one or more values of one or more performance metrics associated with the processing of the first unit of work using the loaded second dataflow graph;

outputting, by the first dataflow graph to a performance monitoring module, the one or more received values of the one or more performance metrics associated with the processing of the first unit of work using the loaded second dataflow graph, wherein the performance monitoring module receives a plurality of values of one or more performance metrics output by a plurality of dataflow graphs;

selecting, from among the plurality of values of the one or more performance metrics output by the plurality of dataflow graphs, values of one or more performance metrics associated with an identifier for the second dataflow graph; and aggregating the values selected for the one or more performance metrics associated with the identifier for the second dataflow graph.

14. The system of claim 13, wherein the second dataflow graph is compiled independent of the first dataflow graph.

15. The system of claim 13, wherein the processing further includes storing the one or more values of the one or more performance metrics associated with the processing of the first unit of work using the loaded second dataflow graph in an in-memory data store.

16. The system of claim 15, wherein the processing further includes transferring the stored one or more values of the one or more performance metrics to a persistent data store.

17. The system of claim 13, wherein the values selected include first values and wherein the processing further includes aggregating second values of the one or more performance metrics output by the plurality of dataflow graphs based on an identifier associated with the first dataflow graph.

18. The system of claim 13, wherein the processing further includes displaying the one or more performance metrics to a user or displaying the aggregated values of the one or more performance metrics to the user.

19. A computing system for processing data, the computing system including:
   means for receiving multiple units of work that each include one or more records;
   determining a characteristic of a first unit of work based on data included in the one or more records of the first unit of work;
   means for identifying, by a component of a first dataflow graph, a second dataflow graph from multiple available dataflow graphs based on the determined characteristic, the multiple available dataflow graphs being stored in a data storage system;
   means for processing the first unit of work using the second dataflow graph based on loading the second dataflow graph into the first dataflow graph;
   means for receiving, by the first dataflow graph, one or more values of one or more performance metrics associated with the processing of the first unit of work using the loaded second dataflow graph;
   means for outputting, by the first dataflow graph to a performance monitoring module, the one or more received values of the one or more performance metrics associated with the processing of the first unit of work using the loaded second dataflow graph, wherein the performance monitoring module receives a plurality of values of one or more performance metrics output by a plurality of dataflow graphs;
   means for selecting, from among the plurality of values of the one or more performance metrics output by the plurality of dataflow graphs, values of one or more performance metrics associated with an identifier for the second dataflow graph; and
   means for aggregating the values selected for the one or more performance metrics associated with the identifier for the second dataflow graph.

20. The system of claim 19, wherein the second dataflow graph is compiled independent of the first dataflow graph.

21. The system of claim 19, further including means for storing the one or more values of the one or more performance metrics associated with the processing of the first unit of work using the loaded second dataflow graph in an in-memory data store.

22. The system of claim 21, further including means for transferring the stored one or more values of the one or more performance metrics to a persistent data store.

23. The system of claim 19, wherein the values selected include first values, the system further including means for aggregating second values of the one or more performance metrics output by the plurality of dataflow graphs based on an identifier associated with the first dataflow graph.

24. The system of claim 19, further including means for displaying the one or more performance metrics to a user or displaying the aggregated values of the one or more performance metrics to the user.

* * * * *